US012346955B2

(12) United States Patent
Sharma et al.

(10) Patent No.: US 12,346,955 B2
(45) Date of Patent: Jul. 1, 2025

(54) METHOD AND SYSTEM OF ENTERPRISE RESOURCE PLANNING

(71) Applicant: Mastercard International Incorporated, Purchase, NY (US)

(72) Inventors: Karan Sharma, Rye Brook, NY (US); Ashfaq Kamal, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 239 days.

(21) Appl. No.: 17/987,180

(22) Filed: Nov. 15, 2022

(65) Prior Publication Data

US 2023/0153894 A1    May 18, 2023

Related U.S. Application Data

(60) Provisional application No. 63/279,751, filed on Nov. 16, 2021.

(51) Int. Cl.
*G06Q 10/0875* (2023.01)
*G06Q 20/02* (2012.01)
*G06Q 20/14* (2012.01)
*G06Q 20/42* (2012.01)
*G06Q 30/0601* (2023.01)

(52) U.S. Cl.
CPC ..... *G06Q 30/0637* (2013.01); *G06Q 10/0875* (2013.01); *G06Q 20/027* (2013.01); *G06Q 20/14* (2013.01); *G06Q 20/425* (2013.01)

(58) Field of Classification Search
CPC .......... G06Q 30/0637; G06Q 10/0875; G06Q 20/027; G06Q 20/14; G06Q 20/425

USPC .......................................................... 705/39
See application file for complete search history.

(56) References Cited

U.S. PATENT DOCUMENTS

| 11,171,911 | B2 * | 11/2021 | Schnitt .................. G06Q 20/12 |
| 2006/0074799 | A1 * | 4/2006 | Averyt .................. G07F 7/0873 705/40 |
| 2009/0276321 | A1 | 11/2009 | Krikorian et al. |

(Continued)

FOREIGN PATENT DOCUMENTS

WO    2021183042 A1    9/2021

OTHER PUBLICATIONS

International Search Report dated Mar. 20, 2023, corresponding to PCT/US2022/049749 (10 pages).

*Primary Examiner* — Clifford B Madamba
(74) *Attorney, Agent, or Firm* — Panitch Schwarze Belisario & Nadel LLP

(57) ABSTRACT

A method for facilitating payment across different enterprise ecosystems through the use of a gateway platform includes: receiving, by a receiver of a processing server, a payment request message from a first computing system, wherein data included in the payment request message is formatted according to a first data format; translating, by a processor of the processing server, the data included in the payment request message into a second data format; transmitting, by a transmitter of the processing server, the translated payment request message to a second computing system; receiving, by the receiver of the processing server, a payment confirmation message; and transmitting, by a transmitter of the processing server, an update message to a third computing system different from the first computing system.

14 Claims, 7 Drawing Sheets

(56) References Cited

U.S. PATENT DOCUMENTS

| | | | |
|---|---|---|---|
| 2010/0088206 A1* | 4/2010 | Lister | G06Q 30/04 |
| | | | 705/34 |
| 2013/0173464 A1 | 7/2013 | Quillian | |
| 2013/0325722 A1* | 12/2013 | Mohan | G06Q 20/14 |
| | | | 705/44 |
| 2014/0310177 A1* | 10/2014 | Eliscu | G06Q 20/0425 |
| | | | 705/44 |
| 2017/0098203 A1 | 4/2017 | Rolfson | |
| 2020/0364760 A1 | 11/2020 | Sabat et al. | |

* cited by examiner

METHOD AND SYSTEM OF ENTERPRISE RESOURCE PLANNING

FIELD

The present disclosure relates to facilitating payment across different enterprise ecosystems through the use of a gateway platform, specifically the use of the gateway platform to enable buyers to pay suppliers that is enterprise resource planning agnostic and enables all entities to use their own personal rules and criteria without affecting system operation.

BACKGROUND

Business management often involves the balancing and operation of dozens, if not hundreds, of different departments and aspects of the business. For many businesses of any size, executives and managers rely on specialized software programs to assist in the operation of the business, aggregation of data, analysis of operations, etc. An industry known as enterprise resource planning (ERP) was born out of the need of businesses to have assistance in managing a vast number of components of the business. Often relying on software, ERP programs and systems assist businesses in managing inventory, accounting, supply chains, payments, etc. Many businesses have become very reliant on their ERP tools and use them constantly as part of day-to-day operations.

However, the reliance of businesses on ERP tools has resulted in a booming industry of hundreds and thousands of different ERP tools, all of which operate using their own rules and formatting. Because of these differences, it can be exceedingly difficult for businesses using two different ERP systems to have an ongoing business relationship. As a result, many businesses often prefer to do business with other entities that utilize the same ERP system to simplify how it affects their operations. However, this significantly restricts the business from being able to interact with other entities and take advantage of a larger marketplace. Unfortunately, there is a lack of technology when it comes to connecting entities that utilize different ERP systems. Thus, there is a need for a technological improvement to these types of ecosystems that enable entities to connect across varying ERP systems.

SUMMARY

The present disclosure provides a description of systems and methods for facilitating payment across different enterprise ecosystems through the use of a gateway platform. A gateway platform connects to a plurality of different enterprise resource planning (ERP) systems through the use of specially design application programming interfaces or add-ons. When a buyer wants to make a payment to a supplier, they submit a payment request to the gateway platform via their own ERP. The gateway platform performs data translation on the payment request to ensure it is in a data format suitable for the recipient, such as the seller's ERP. The translated payment request is then submitted to the buyer's financial institution, which may be forwarded through a payment service for further translation. The buyer's financial institution makes a payment to the seller's financial institution, and the gateway platform is notified of the payment. The gateway platform then provides information regarding the payment to the seller's own ERP in a suitable format for that ERP. The result is that buyers and suppliers can continue to utilize their own ERPs without the need to make any adjustments to their business operations and be able to freely transact with any other entity utilizing any of the plurality of different ERP systems. The gateway platform can also enable any involved entity to set their own rules or preferences regarding payments, requests for payment, etc., as the rules can be enforced through data translations and modifications to the processing of requests and payments. Thus, the gateway platform provides a massive technological improvement for existing entities to significantly increase the available marketplace and improve efficiency and convenience.

A method for facilitating payment across different enterprise ecosystems through the use of a gateway platform includes: receiving, by a receiver of a processing server, a payment request message from a first computing system, wherein data included in the payment request message is formatted according to a first data format; translating, by a processor of the processing server, the data included in the payment request message into a second data format; transmitting, by a transmitter of the processing server, the translated payment request message to a second computing system; receiving, by the receiver of the processing server, a payment confirmation message; and transmitting, by a transmitter of the processing server, an update message to a third computing system different from the first computing system.

A system for facilitating payment across different enterprise ecosystems through the use of a gateway platform includes: a first computing system; a second computing system; a third computing system different from the first computing system; and a processing server including a receiver receiving a payment request message from the first computing system, wherein data included in the payment request message is formatted according to a first data format, a processor translating, the data included in the payment request message into a second data format, and a transmitter transmitting the translated payment request message to the second computing system, wherein the receiver further receives a payment confirmation message, and the transmitter further transmits an update message to the third computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
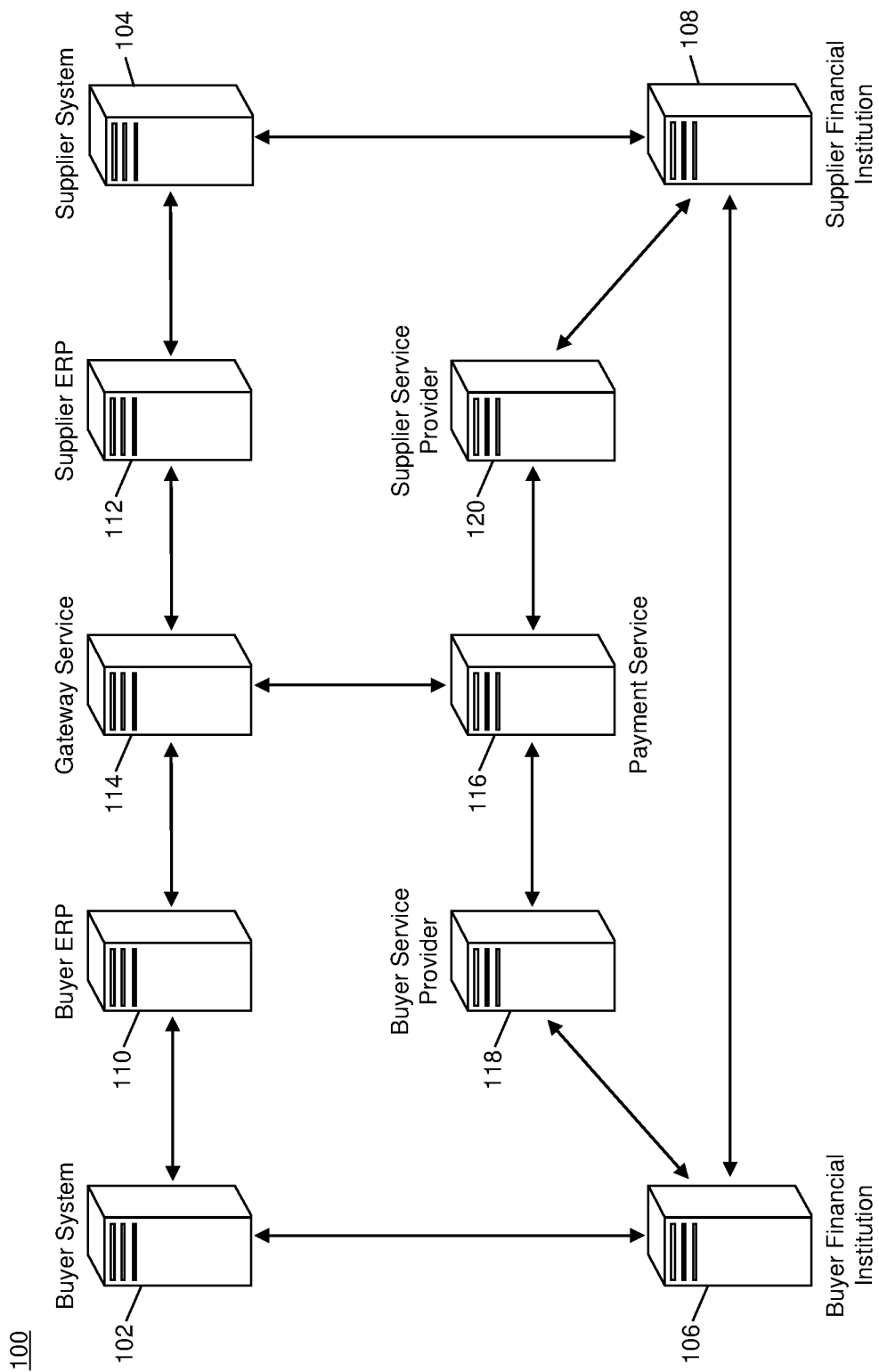
FIG. 1 is a block diagram illustrating a high-level system architecture for facilitating payment across different enterprise ecosystems in accordance with exemplary embodiments.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Facilitating Payments Across Different ERP Systems

FIG. 1 illustrates a system 100 for facilitating payments across different enterprise resource planning (ERP) systems through the use of a gateway platform and, in some embodiments, a payment service.

In the system 100, a buyer system 102 associated with an entity interested in buying a product may be interested in making a payment to a supplier system 104 associated with an entity interested in selling that product to the buyer in exchange for the payment. The buyer and supplier may each utilize transaction accounts issued thereto by a respective financial institution, illustrated in FIG. 1 as the buyer financial institution 106 and the supplier financial institution 108. Each respective financial institution may issue a transaction account to the entity for use in making or receiving payments as part of normal business operations. In a traditional system without the use of ERPs, the buyer system 102 may instruct the buyer financial institution 106 to directly make a payment to the supplier financial institution 108 as instructed by the supplier system 104. The two financial institutions would exchange funds and transaction accounts for the buyer and supplier debited and credited accordingly.

In the system 100, the buyer system 102 may utilize a buyer ERP 110. The buyer ERP 110 may be an ERP system that provides the buyer system 102 with assistance in the management of business activities including accounts payable and accounts receivable. The ERP system may be a standard ERP system that is configured to perform traditional functions of an ERP system. The supplier system 104 may also utilize a supplier ERP 112, which may also be a standard ERP system to provide the supplier system 104 with assistance in the management of business activities. In an exemplary embodiment, the buyer ERP 110 and supplier ERP 112 may be different ERP systems, such as developed and operated by different entities, and may utilize different data formatting rules and principals.

The system 100 may include a gateway service 114. The gateway service 114 may be a centralized processing service comprised of one or more computing systems that is configured to communicate with a plurality of different ERP systems, each of which may utilize their own data formatting rules and principals, including at least the buyer ERP 110 and supplier ERP 112. The gateway service 114 may use specially configured application programming interfaces (APIs), add-ons, or protocols to communicate with each of the different interfaced ERP systems. In the system 100, when a buyer system 102 wants to make a payment to a supplier system 104, the buyer system 102 may submit a payment request message to their buyer ERP 110 using any suitable method. The payment request message may specify the supplier system 104 as the payee as well as the amount to be made and any additional information that may be necessary or useful in facilitating the payment, such as a payment date, currency types, fees, invoice numbers, etc. The buyer ERP 110 may electronically transmit the payment request message to the gateway service 114 using a suitable communication network and method, such as the specially configured add-on the gateway service 114 uses with the buyer ERP 110.

The gateway service 114 may receive the payment request message from the buyer ERP 110. The gateway service 114 may identify the payee for the requested payment using information included in the payment request message, such as an entity identification value, a payee number, or other suitable data. The gateway service 114 may then identify the supplier ERP 112 that the payee uses, such as may be stored in an account profile associated with the identified payee. The gateway service 114 may determine any information that may be necessary to facilitate the payment for receipt by the payee, such as specialized rules or instructions set by the supplier system 104 (e.g., identified in the account profile) or the supplier ERP 112, which may be stored in a profile associated with the supplier ERP 112. For example, the supplier system 104 may specify timing information or an account number for payment or the supplier ERP 112 may have data requirements for reporting of the payment.

The gateway service 114 may identify any necessary information for the payment request message and then perform data translation on the payment request message to reformat the data as necessary to suit the supplier ERP 112 and/or supplier system 104 and/or to include any data needed to facilitate the payment, such as receiving transaction account information. The gateway service 114 may then electronically transmit the translated payment request message to a payment service 116. The payment service 116 may be a computing system that is configured to communicate with multiple payment service providers and/or financial institutions to provide data and assistance with the initiation and fulfillment of payments in the system 100. In some embodiments, the payment service 116 may be a part of the same computing system as the gateway service 114. In some cases, a single processing server or series of processing servers in communication may operate as both the gateway service 114 and the payment service 116.

The payment service 116 may receive the payment request message and identify the buyer financial institution 106 associated with the buyer system 102 that is to make the payment to the supplier financial institution 108, such as based on payer transaction account information included in the payment request message. The payment service 116 may submit a message to the buyer financial institution 106 via a suitable communication network and method that includes the payee transaction account information and payment amount to be made. The buyer financial institution 106 may receive the message and initiate the payment for the payment amount to the supplier financial institution 108 and to the specified transaction account. The supplier financial institution 108 may receive the payment, credit the supplier system's transaction account accordingly, and electronically transmit a notification message to the payment service 116 using a suitable communication network and method. The notification message may include a notification indicating successful payment by the buyer financial institution 106 and may also include a transaction identifier. In some cases, the transaction identifier may be generated by the supplier financial institution 108 or the buyer financial institution 106 (e.g., and included with the payment made). In other cases, the payment service 116 and/or gateway service 114 may have generated the transaction identifier, which may have been included in the message submitted to the buyer financial institution 106. In some instances, the transaction identifier may be an invoice number, which may have originally been supplied by the supplier system 104 and/or supplier ERP 112, as discussed below.

In some embodiments, the system 100 may also include a service provider operating on behalf of the buyer financial institution 106 or supplier financial institution 108, such as the buyer service provider 118 and supplier service provider 120 illustrated in FIG. 1. A service provider may be an entity that assists a financial institution in the management and initiation of payment transactions on behalf of other entities, such as by operating as an intermediary between the payment service 116 and the financial institution. In such embodiments, communications made by or to the payment service 116 to or from a financial institution may be communicated through a service provider. For example, the payment service 116 may submit the message for the payment to be made to the supplier financial institution 108 to the buyer service provider 118 using a suitable communication network and method. The buyer service provider 118 may then inform the buyer financial institution 106 of any suitable information needed to initiate the payment to the supplier financial institution 108.

In some cases, the payment service 116 may be configured to perform data translation on a received payment request message. For instance, the payment service 116 may identify a buyer service provider 118 based on data included in the payment request message. The payment service 116 may then translate the payment request message by reformatting data included therein into a format suitable for receipt by the buyer service provider 118. The payment service 116 may electronically transmit the translated message to the buyer service provider 118 to have the payment to the supplier financial institution 108 initiated. Similarly, the supplier service provider 120 may electronically transmit a confirmation message to the payment service 116, which the payment service 116 may perform data translation on for reformatting of the data prior to communicating with the gateway service 114.

Once the payment service 116 has received a confirmation message for the successful payment made from the buyer financial institution 106 to the supplier financial institution 108, the payment service 116 may electronically transmit the confirmation message, with the transaction identifier included (e.g., and translated, if applicable), to the gateway service 114 using the suitable communication network and method. The gateway service 114 may receive the confirmation message and may perform data translation on the confirmation message to ensure that the data is formatted in a manner suitable for receipt by the supplier ERP 112. The gateway service 114 may then electronically transmit the translated confirmation message to the supplier ERP 112 using the suitable communication network and method. The supplier ERP 112 may receive the confirmation message in a format suitable for its use and may update the supplier system 104 accordingly regarding the receipt of the payment, such as by updating its accounts receivable, updating the status of a corresponding invoice (e.g., identified via the transaction identifier), etc.

In some embodiments, the system 100 may be configured to also facilitate requests for payment, such as may be submitted by a supplier system 104 for fulfillment by a buyer system 102 using the process discussed above. For example, the supplier system 104 may submit a request for payment or invoice to its supplier ERP 112, which may be then forwarded to the gateway service 114 using the suitable communication network and method. The gateway service 114 may identify the intended buyer system 102 based on information included in the request for payment or invoice and, subsequently, the associated buyer ERP 110. The gateway service 114 may perform data translation on the request for payment or invoice and then forward the translated message to the buyer ERP 110. The buyer ERP 110 may update the buyer system's 102 data accordingly such that the buyer system 102 can submit a payment request message to fulfill the request for payment or invoice.

The methods and systems discussed herein enable payments to be facilitated between a buyer system 102 and supplier system 104 utilizing different ERPs through the use of the gateway service 114. Because the gateway service 114 is centrally located and interfaced with a plurality of different ERP systems, buyers and suppliers can continue to use their existing ERPs without any modifications to their data or processes. The gateway service 114 performs all necessary data translations such that the buyer ERP 110 and supplier ERP 112 do not have to modify their own data formatting practices or communication processes. The gateway service 114 then provides payment information to a payment service 116, which can similarly perform any necessary data translations to ensure that the payment is made between the appropriate financial institutions. The result is that the buyer system 102 and supplier system 104 can continue business as usual while still conducting business with other entities that use any number of different ERPs because of the technical improvements performed by the gateway service 114 as discussed herein.

Computing System

Figure 2:
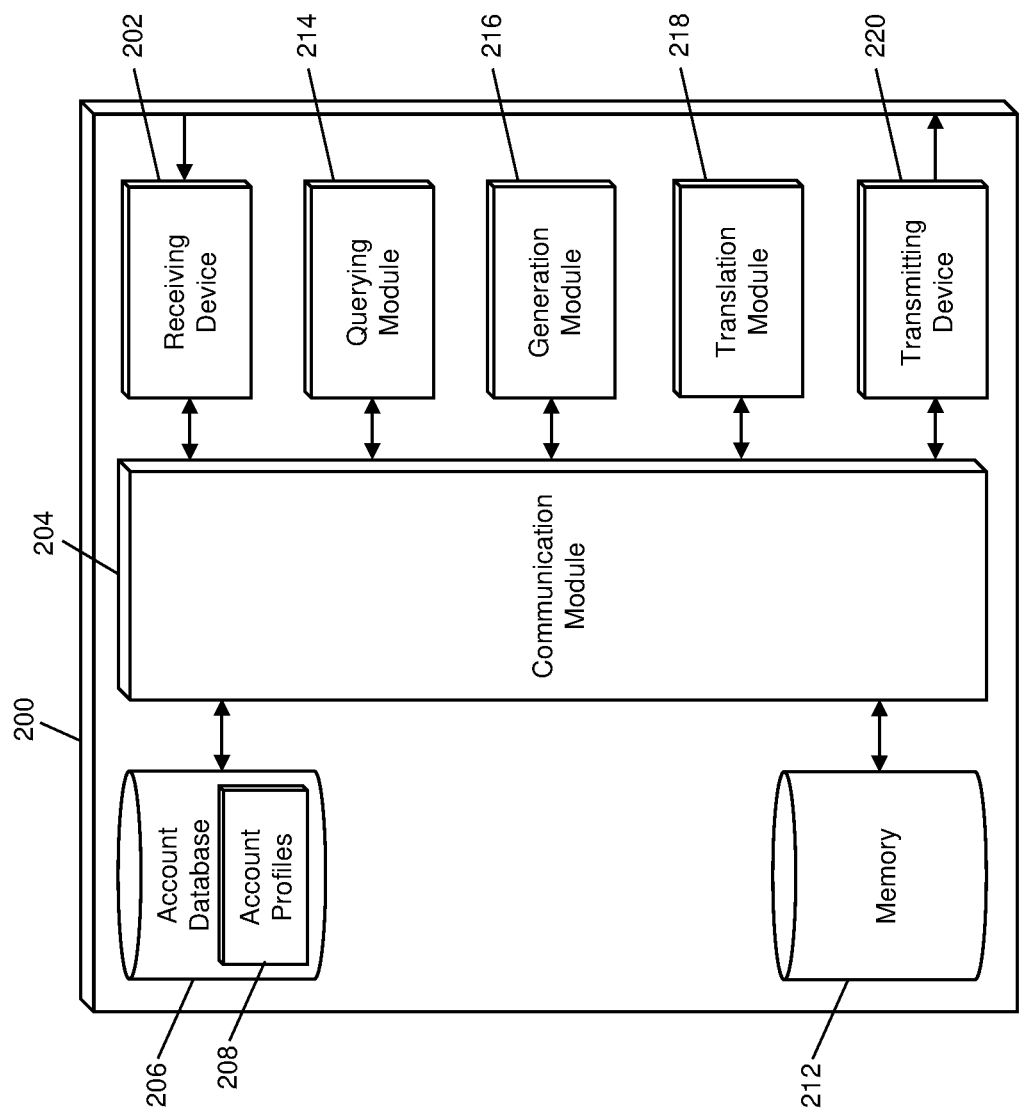
FIG. 2 is a block diagram illustrating a computing system in the system of FIG. 1 for facilitating payment across different enterprise ecosystems in accordance with exemplary embodiments.

FIG. 2 illustrates an embodiment of a computing system 200, such as may be used to perform the functions of the gateway service 114 and/or payment service 116 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from buyer financial institutions 106, supplier financial institutions 108, buyer ERPs 110, supplier ERPs 112, gateway services 114, payment services 116, buyer service providers 118, supplier service providers 120, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by buyer financial institutions 106, supplier financial institutions 108, buyer service providers 118, or supplier service providers 120 that may be superimposed or otherwise encoded with confirmation messages regarding fulfilled payments or requests for transaction account information. The receiving device 202 may also be configured to receive data signals electronically transmitted by buyer ERPs 110 and supplier ERPs 112, which may be superimposed or otherwise encoded with requests for payment, invoices, payment request messages, rules or preferences, transaction account data, requests for transaction information, etc. The receiving device 202 may also be configured to receive data signals electronically transmitted by gateway services 114 or payment services 116 that may be superimposed or otherwise encoded with translated payment request messages or translated payment confirmation messages.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as an encryption module 210, querying module 214, generation module 216, translation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more registered accounts, such as an account registered to a supplier, buyer, ERP, service provider, etc. For instance, an account profile may include transaction account data, identification values, rules or preferences, data formatting rules, communication data, etc.

The computing system 200 may also include a memory 212. The memory 212 may be configured to store data for use by the computing system 200 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information, data formatting rules, data translation rules and algorithms, etc.

The computing system 200 may include a querying module 214. The querying module 214 may be configured to execute queries on databases to identify information. The querying module 214 may receive one or more data values or query strings and may execute a query string based thereon on an indicated database, such as the memory 212 of the computing system 200 to identify information stored therein. The querying module 214 may then output the identified information to an appropriate engine or module of the computing system 200 as necessary. The querying module 214 may, for example, execute a query on the account database 206 to identify an account profile 208 associated with a supplier system 104 for which a payment request message is received, such as to identify transaction account information or rules stored therein, or to identify an associated supplier ERP 112 for use in data translation.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate request messages, confirmation messages, payment messages, transaction identifiers, translated data sets, etc.

The computing system 200 may also include a translation module 218. The translation module 218 may be configured to perform translations for the computing system 200 as part of the functions discussed herein. The translation module 218 may receive instructions as input, which may also include data to be used in performing a translation, may perform a translation as requested, and may output a result of the translation to another module or engine of the computing system 200. The translation module 218 may, for example, be configured to perform data translations on received payment request messages, payment confirmation messages, requests for payment, invoices, etc., such as by reformatting data stored therein into a different format based on data formatting rules that may be stored in an account profile 208 or the memory 212.

The computing system 200 may also include a transmitting device 220. The transmitting device 220 may be configured to transmit data over one or more networks via one or more network protocols. In some instances, the transmitting device 220 may be configured to transmit data to buyer financial institutions 106, supplier financial institutions 108, buyer ERPs 110, supplier ERPs 112, gateway services 114, payment services 116, buyer service providers 118, supplier service providers 120, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to buyer financial institutions 106, supplier financial institutions 108, buyer service providers 118, and supplier service providers 120 that may be superimposed or otherwise encoded with translated payment request messages, transaction account information, payment amounts, transaction identifiers, etc. The transmitting device 220 may also be configured to electronically transmit data signals to buyer ERPs 110 and supplier ERPs 112, which may be superimposed or otherwise encoded with translated requests for payment or invoices, translated confirmation messages, transaction account information, etc. The transmitting device 220 may be further configured to electronically transmit data signals to gateway services 114 and payment services 116 that may be superimposed or otherwise encoded with translated requests for payment, translated confirmation messages, etc.

Process for Facilitating Payments

Figure 3A:
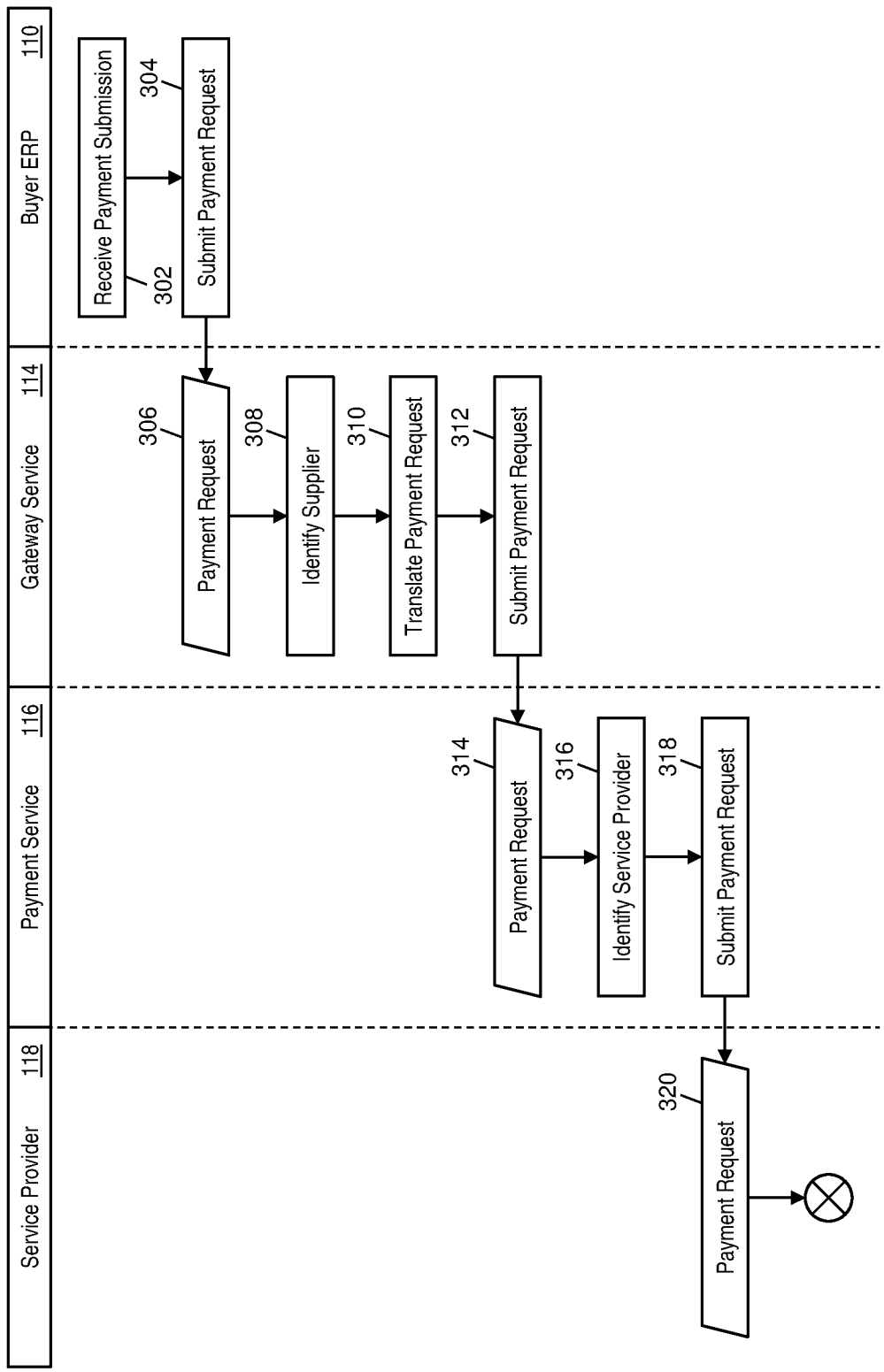
FIGS. 3A and 3B are a flow diagram illustrating a process for facilitating payment across different enterprise ecosystems in accordance with exemplary embodiments.
Figure 3B:
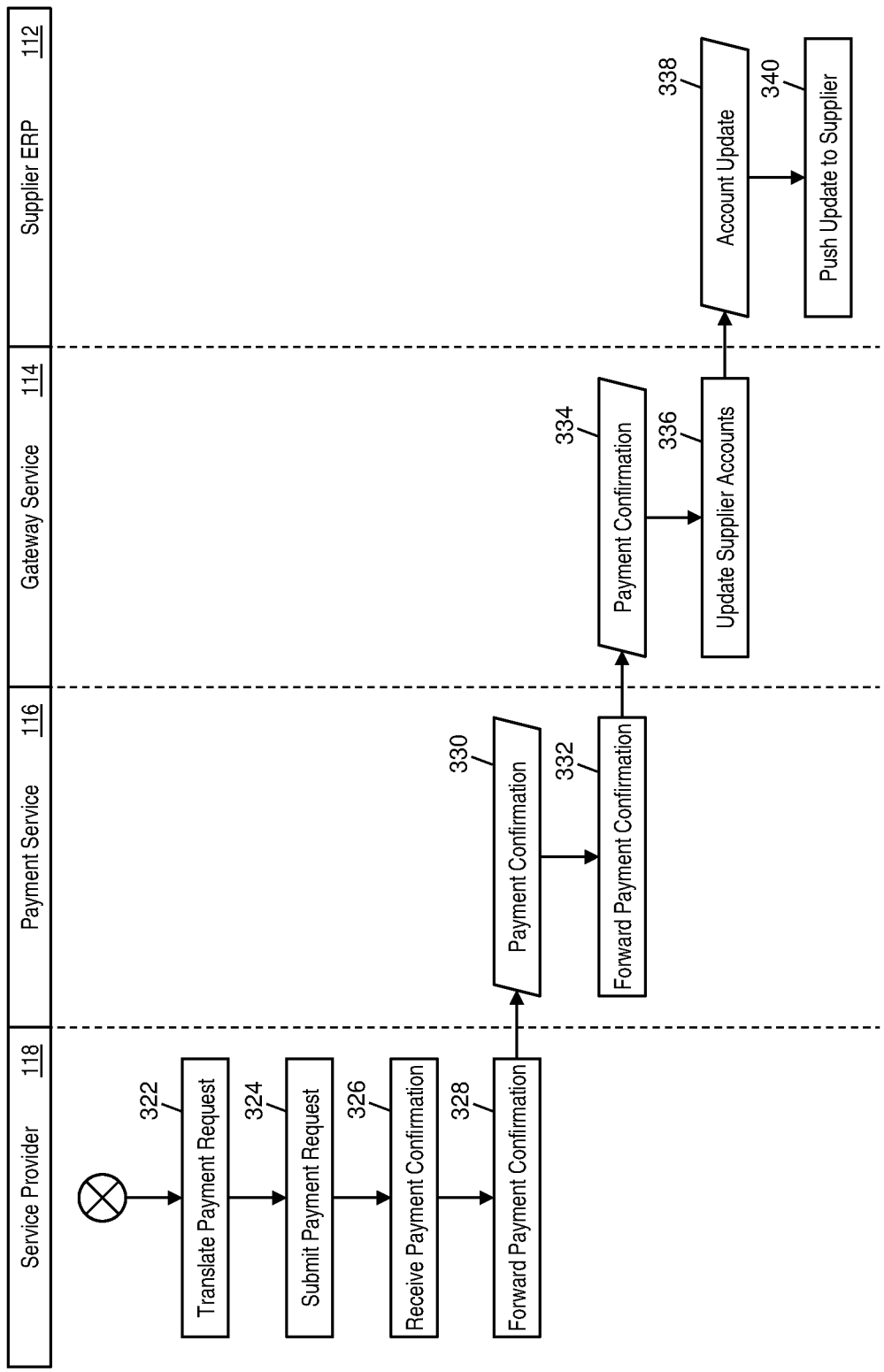

FIGS. 3A and 3B illustrate a process for facilitating payments in the system 100 in FIG. 1 for entities using different ERPs through the use of a gateway service 114 and payment service 116. In the process illustrated in FIGS. 3A and 3B, the service provider 118 may be a service provider for both the buyer financial institution 106 and supplier financial institution 108 and thus may perform the functions of both the buyer service provider 118 and supplier service provider 120 as discussed above.

In step 302, a buyer ERP 110 may receive a payment submission from a buyer system 102, where the payment submission includes at least a payee identifier and a payment amount. In some cases, the payment submission may also include an invoice number or other identifier for the payment to be made, as well as payer identification data. In step 304, the buyer ERP 110 may submit a payment request message to the gateway service 114 using a suitable communication network and method. In step 306, a receiving device 202 of the gateway service 114 may receive the payment request message. In step 308, a querying module 214 of the gateway service 114 may execute a query on an account database 206 of the gateway service 114 to identify an account profile 208 associated with the intended payee supplier system 104 based on the payee identifier included in the received payment request message. In step 310, the translation module 218 of the gateway service 114 may translate the payment request message to be in a format suitable for use by the payment service 116 and/or a service provider 118, which may also include the inclusion of transaction account data for the payee, such as identified in the identified account profile 208. In step 312, a transmitting device 220 of the gateway service 114 may electronically transmit the translated payment request message to the payment service 116 using a suitable communication network and method.

In step 314, a receiving device 202 of the payment service 116 may receive the translated payment request message from the gateway service 114. In step 316, a querying module 214 of the payment service 116 may execute a query on an account database 206 of the payment service 116 to identify an account profile 208 associated with the buyer using the payer identification data included in the translated payment request message. The account profile 208 may be used to identify a service provider 118 that is associated with the buyer system 102 and used for initiating payments on behalf of the buyer system 102. In step 318, a transmitting device 220 of the payment service 116 may electronically transmit the translated payment request message to the identified service provider 118 using a suitable communication network and method. In some embodiments, the payment service 116 may first (e.g., via a translation module 218) translate the payment request message further to satisfy data formatting requirements of the identified service provider 118.

In step 320, the service provider 118 may receive the payment request message from the payment service 116. In step 322, the service provider may translate the received payment request message into a data format suitable for use by a buyer financial institution 106. In some cases, translation of the received payment request message may include generation of a new message that includes payer information, transaction account information for the payee, the payment amount, and, if applicable, an invoice number or transaction identifier. In step 324, the translated payment request message may be submitted to the buyer financial institution 106 for use by the buyer financial institution 106 in making payment of the stated payment amount to a supplier financial institution 108 associated with the provided transaction account information. In step 326, the service provider 118 may receive a payment confirmation message from the supplier financial institution 108 indicating that the payment was successfully made for the stated payment amount. In some cases, the payment confirmation message may also include an invoice number or transaction identifier. In step 328, the service provider 118 may forward the payment confirmation message to the payment service 116 using a suitable communication network and method.

In step 330, a receiving device 202 of the payment service 116 may receive the payment confirmation message from the service provider 118. In step 332, a transmitting device 220 of the payment service 116 may electronically transmit the payment confirmation message to the gateway service 114 using a suitable communication network and method. In step 334, a receiving device 202 of the gateway service 114 may receive the forwarded payment confirmation message. In some embodiments, a translation module 218 of the gateway service 114 may translate the payment confirmation message upon receipt to reformat data therein into a data format suitable for receipt by the supplier ERP 112. In step 336, a transmitting device 220 of the gateway service 114 may electronically transmit the payment confirmation message (e.g., translated, as applicable) or an update message to the supplier ERP 112 using a suitable communication network and method. In step 338, the supplier ERP 112 may receive the payment confirmation message or update message from the gateway service 114 that includes at least the invoice number or transaction identifier. In step 340, the supplier ERP 112 may push update information regarding the supplier system's accounts to the supplier system 104 as a result of the successful payment.

Exemplary Facilitating Payments Across Different ERPs

Figure 4:
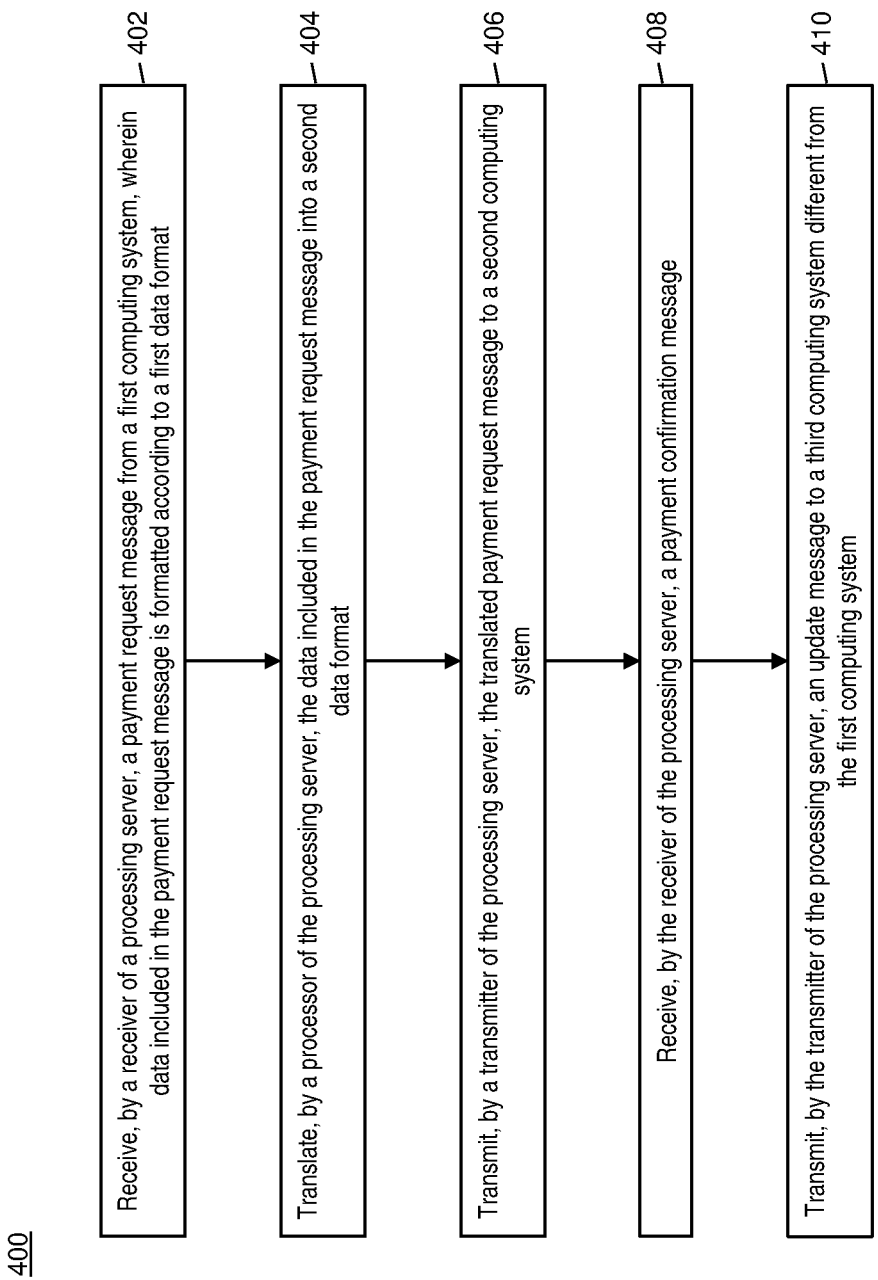
FIG. 4 is a flow chart illustrating an exemplary method for facilitating payment across different enterprise ecosystems through the use of a gateway platform in accordance with exemplary embodiments.

FIG. 4 illustrates a method 400 for facilitating payment across different enterprise ecosystems through the use of a gateway platform.

In step 402, a payment request message may be received by a receiver (e.g., receiving device 202) of a processing server (e.g., gateway service 114) from a first computing system (e.g., buyer ERP 110), wherein data included in the payment request message is formatted according to a first data format. In step 404, the data included in the payment request message may be translated by a processor (e.g., translation module 218) of the processing server into a second data format.

In step 406, the translated payment request message may be transmitted by a transmitter (e.g., transmitting device 220) of the processing server to a second computing system (e.g., payment service 116). In step 408, a payment confirmation message may be received by the receiver of the processing server. In step 410, an update message may be transmitted by the transmitter of the processing server to a third computing system (e.g., supplier ERP 112) different from the first computing system.

In one embodiment, the payment request message may be received from the first computing system using a first application programming interface (API), and the update message may be transmitted to the third computing system using a second API. In some embodiments, the payment confirmation message may be received from the second computing system. In one embodiment, the second computing system may be a payment services platform. In some embodiments, the payment confirmation may include a transaction identifier, and the update message may include the transaction identifier. In one embodiment, the method 400 may further include: storing, in an account database (e.g., account database 206) of the processing server, an account profile (e.g., account profile 208); and identifying, by the processor of the processing server, the account profile based on the data included in the payment request message, wherein translating the data included in the payment request message includes inserting payment instructions into the payment request message based on data included in the identified account profile.

In some embodiments, the method 400 may also include: identifying, by a processor (e.g., querying module 214) of the second computing system, a first service provider system (e.g., buyer service provider 118) based on the translated data included in the payment request message; transmitting, by a transmitter (e.g., transmitting device 220) of the second computing system, a payment information message to the identified first service provider system; receiving, by a receiver (e.g., receiving device 202) of the second computing system, a receipt of funds message from a second service provider system (e.g., supplier service provider 120); and transmitting, by the transmitter of the second computing system, the payment confirmation message to the processing server. In a further embodiment, the receipt of funds message may include a transaction identifier, the payment confirmation message may include the transaction identifier, and the update message may include the transaction identifier.

Computer System Architecture

Figure 5:
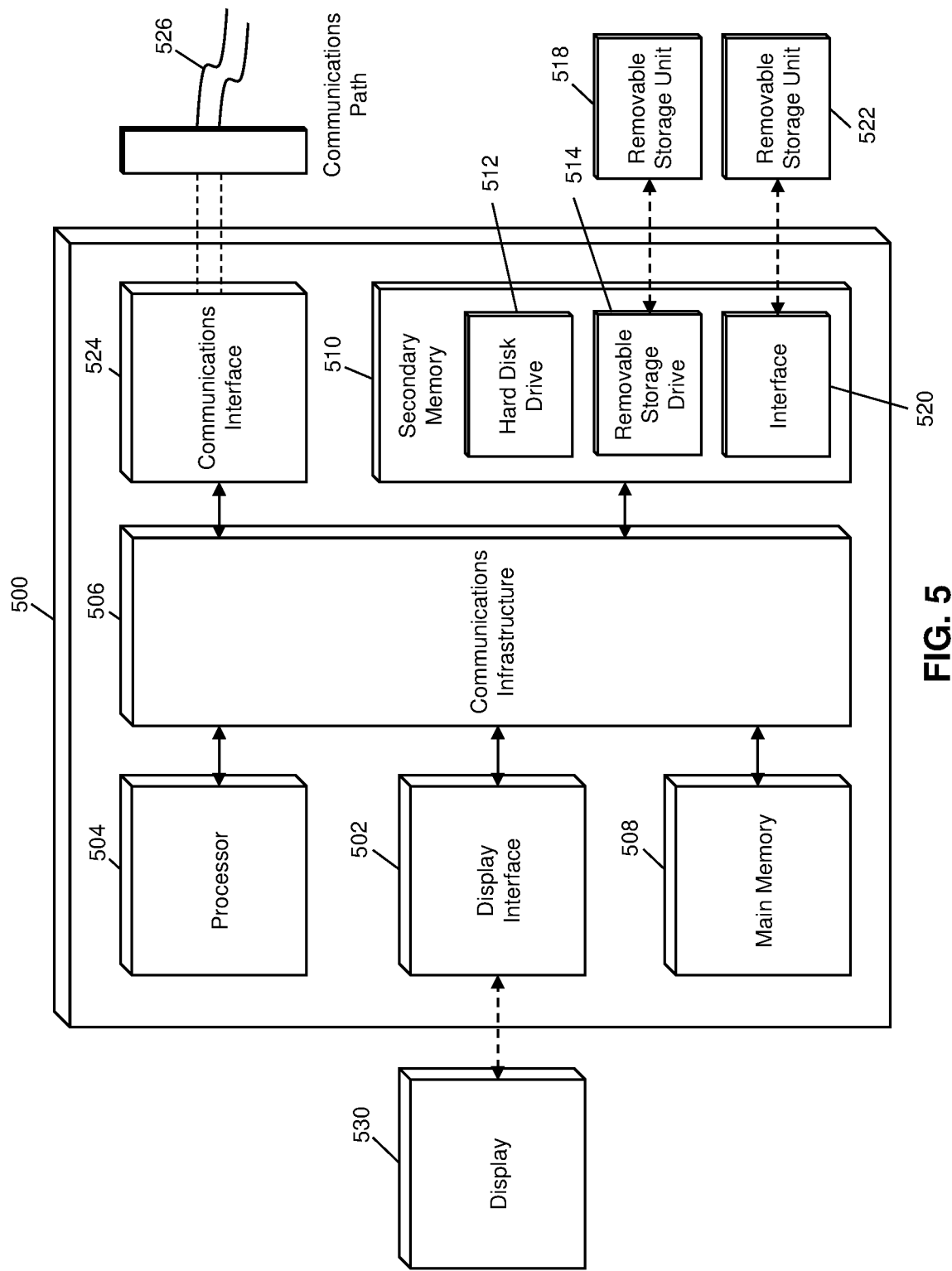
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the gateway service 114 and payment service 116 of FIG. 1 and the computing system 200 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower-level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Figure 6:
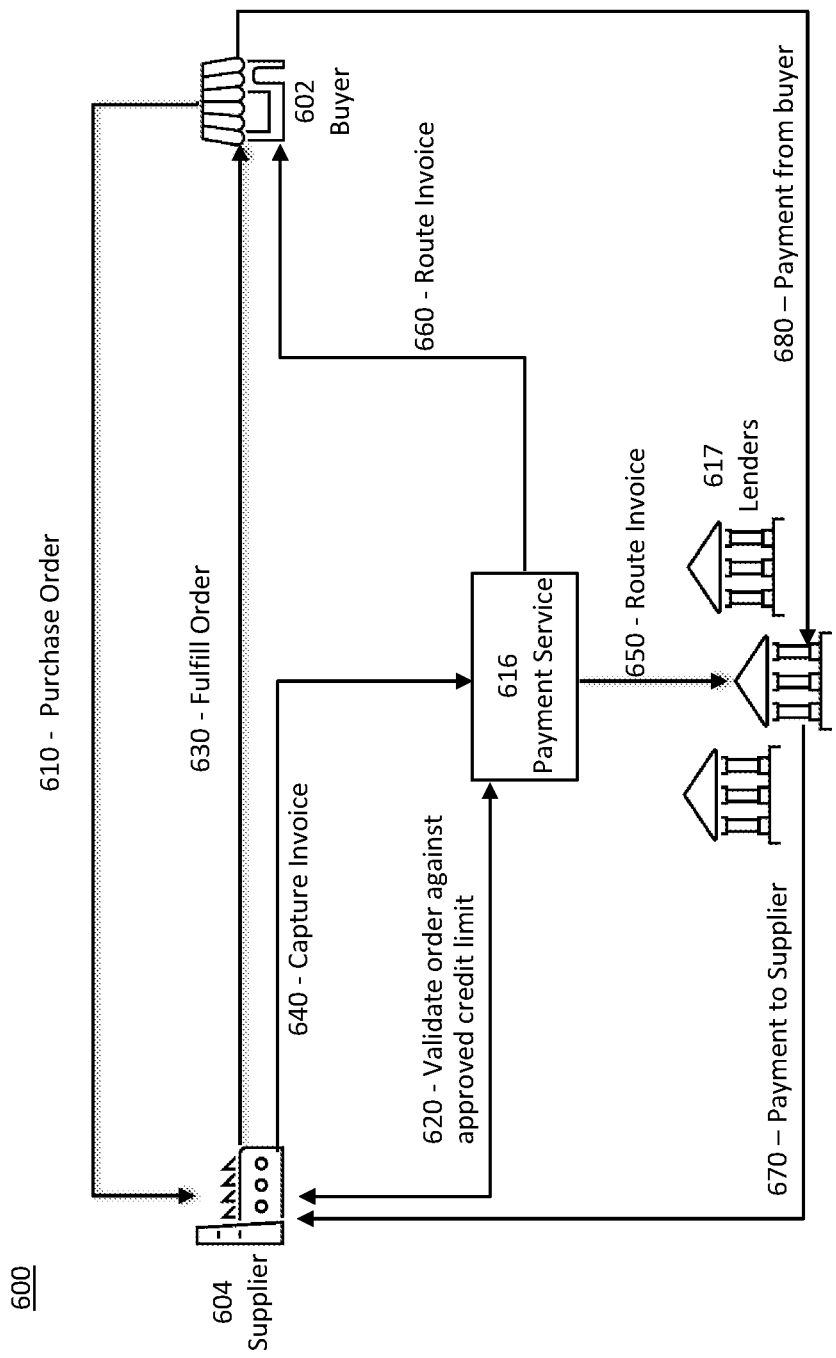
FIG. 6 is a flow diagram illustrating transaction flow in accordance with exemplary embodiments involving a third-party lender.

FIG. 6 is a flow diagram illustrating transaction flow 600 in accordance with an exemplary embodiment of a system (for example, system 100 in FIG. 1) that further involves a fourth computing system, such as a third-party lender 617.

According to an embodiment, and prior to the transaction flow illustrated in FIG. 6, a third-party lender 617 (of a plurality of third-party lenders) may analyze ERP data of a supplier 604 received from the supplier ERP (e.g., Supplier ERP 112 in FIG. 1—not depicted in FIG. 6), via a gateway service (gateway service 114 in FIG. 1—not depicted in FIG. 6) and the payment service 616, in order to finalize program pricing and credit terms. When a buyer 602 is interested in purchasing a product from the supplier 604, the payment service 616 may notify the buyer 602 (e.g., via email, text message, text, display on an interface, or other suitable communication protocol) that lender trade credit is available to the buyer 602 so he/she would not be required to provide a payment-in-full to the supplier 604 for the product but, rather, the buyer 602 would provide a series of payments (e.g., bi-monthly, monthly, etc.) to the third-party lender 617.

If interested, the buyer 602 would submit a credit application through a buyer portal of the payment service 616. The payment service 616 would forward the credit application to the third-party lender 617, which would approve or deny the buyer's credit application. If the third-party lender 617 denies the credit application, a denial notification is sent to the buyer 602, via the payment service 616. If the third-party lender 617 approves the credit application, it determines a credit limit for the buyer 602 and transmits an approval notification (including the credit limit) to the buyer 602, via the payment service 616. If the buyer 602 would like to continue with a payment transaction to purchase the product from the supplier 604 using the approved trade credit, the buyer 602 would place an order (purchase order; step 610) with the supplier 604. The supplier 604 may then communicate with the payment server 616, which runs a credit limit and validation check in order to validate the order against the buyer's approved credit limit (step 620) (e.g., receive an authorization response). Once the order is validated, the supplier 604 fulfills the order, ships the ordered product to the buyer 602 (fulfill order—step 630) and issues an invoice for the payment transaction to the payment service 616.

The payment service 616 may then route the invoice for the order to the third-party lender 617 (step 650). In some embodiments, the payment service 616 routes invoices individually to the third-party lender 617. In other embodiments, the payment service 616 routes all invoices collected for a given period of time at once. In other words, invoices may be routed to the third-party lender 617, for example, at the end of each day. The third-party lender 617 may then issue a payment to the supplier 604 for the full transaction amount for the order, for example, within 24 hours or other timeframe (step 660). For example, if the buyer 602 purchased a $500 product from supplier 604 using trade credit, the third-party lender 617 would make payment to the supplier 604, within 24 hours, for $500 (e.g., via deposit into a transaction account associated with the supplier 604). In some embodiments, the system 600 may enable Virtual Cloud Network (VCN) payment disbursement from the lender 617 to the supplier 604. In some embodiments, the supplier 604 may notify the payment service 616 that payment-in-full was received from the third-party lender 617, and the payment service 616 may then communicate with the supplier ERP (e.g., supplier ERP 112 in FIG. 1) via the gateway service (gateway service 114 in FIG. 1) in order to close invoices in the supplier ERP.

The payment service 616 may also generate an invoice for provision to the buyer 602 based on previously established terms and conditions. Continuing with the example involving the $500 purchase described above, the terms and conditions may involve, for example, four equal bi-monthly payments to be paid to the third-party lender 617. In such an example, the buyer 602 would be obligated to submit payments in the amount of $125 every two weeks to the third-party lender 617 until the $500 purchase amount is paid in full. Thus, the payment service 616 would generate an invoice in the amount of $125 as a first payment and issue/route the invoice to the buyer 602 (step 660). The buyer 602 may then submit the necessary payment to the third-party lender 617, via the buyer portal provided by the payment service 616, in response to receiving the invoice from the payment service 616. The payment service 616 would then continue to generate and issue invoices (e.g., every two weeks) in the agreed-up on amount (e.g., $125) for payment to the third-party lender 617 until the total purchase amount (e.g., $500) has been paid by the buyer 602. Of course, additional charges or other considerations for providing the lending service can be part of these transactions.

Embodiments described above associated with FIG. 6, bring together sellers, buyers and third-party lenders on the same platform and are API (application program interface) based, which allows for quick implementation and faster scalability.

Techniques consistent with the present disclosure provide, among other features, systems and methods for facilitating payment across different enterprise ecosystems through the use of a gateway platform. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating payment across different enterprise ecosystems through the use of a gateway platform, comprising:
   receiving, by a receiver of a processing server, via a first application programming interface (API) of a plurality of specially designed APIs, a payment request message from a first computing system of a plurality of different computing systems, wherein data included in the payment request message is formatted according to a first data format;
   translating, by a processor of the processing server, the data included in the payment request message into a second data format, different from the first data format, suitable for a second computing system that utilizes different data formatting rules and principals than the first computing system;
   transmitting, by a transmitter of the processing server, the translated payment request message to the second computing system;
   receiving, by the receiver of the processing server, a payment confirmation message from the second computing system; and
   after receiving the payment confirmation message from the second computing system, transmitting, by transmitter of the processing server, via a second API of the plurality of specially designed APIs, an update message to a third computing system different from the first computing system and the second computing system.

2. The method of claim 1, wherein the second computing system is a payment services platform.

3. The method of claim 1, wherein
the payment confirmation includes a transaction identifier, and
the update message includes the transaction identifier.

4. The method of claim 1, further comprising:
storing, in an account database of the processing server, an account profile; and
identifying, by the processor of the processing server, the account profile based on the data included in the payment request message, wherein
translating the data included in the payment request message includes inserting payment instructions into the payment request message based on data included in the identified account profile.

5. The method of claim 1, further comprising:
identifying, by a processor of the second computing system, a first service provider system based on the translated data included in the payment request message;
transmitting, by a transmitter of the second computing system, a payment information message to the identified first service provider system;
receiving, by a receiver of the second computing system, a receipt of funds message from a second service provider system; and
transmitting, by the transmitter of the second computing system, the payment confirmation message to the processing server.

6. The method of claim 5, wherein
the receipt of funds message includes a transaction identifier;
the payment confirmation message includes the transaction identifier; and
the update message includes the transaction identifier.

7. The method of claim 1, further comprising:
communicating, by the processing server, with a fourth computing system, from a plurality of fourth computing systems, to determine and finalize program pricing and credit terms for potential trade credit offerings to the first computing system.

8. A system for facilitating payment across different enterprise ecosystems through the use of a gateway platform, comprising:
   a plurality of different computing systems including at least a first computing system, a second computing system, and a third computing system different from the first computing system and the second computing system, wherein at least the first computing system utilizes different data formatting rules and principals than the second computing system; and
   a processing server including
      a receiver receiving, via a first application programming interface (API) of a plurality of specially designed APIs, a payment request message from the first computing system, wherein data included in the payment request message is formatted according to a first data format,
      a processor translating, the data included in the payment request message into a second data format, different from the first data format, suitable for the second computing system, and
      a transmitter transmitting the translated payment request message to the second computing system, wherein
   the receiver further receives a payment confirmation message from the second computing system, and
   the transmitter, after receiving the payment confirmation message from the second computing system, further transmits, via a second API of the plurality of specially designed APIs, an update message to the third computing system.

9. The system of claim 8, wherein the second computing system is a payment services platform.

10. The system of claim 8, wherein
the payment confirmation includes a transaction identifier, and
the update message includes the transaction identifier.

11. The system of claim 8, wherein
the processing server further includes an account database storing an account profile,
the processor of the processing server further identifies the account profile based on the data included in the payment request message, and
translating the data included in the payment request message includes inserting payment instructions into the payment request message based on data included in the identified account profile.

12. The system of claim 8, wherein the second computing system includes
a processor identifying, a first service provider system based on the translated data included in the payment request message,
a transmitter transmitting a payment information message to the identified first service provider system, and
a receiver receiving a receipt of funds message from a second service provider system, and
the transmitter of the second computing system further transmits the payment confirmation message to the processing server.

13. The system of claim 12, wherein
the receipt of funds message includes a transaction identifier;
the payment confirmation message includes the transaction identifier; and
the update message includes the transaction identifier.

14. The system of claim 8, further comprising:
a plurality of fourth computing systems, different from the first computing system, the second computing system, and the third computing system, wherein
the processing server further communicates with a fourth computing system, from the plurality of fourth computing systems, to determine and finalize program pricing and credit terms for potential trade credit offerings to the first computing system.

* * * * *